April 18, 1967    F. A. LAPINSKI    3,315,266
RECORD DRIVE SYSTEM INCLUDING FEEDBACK MEANS
Filed Nov. 25, 1964
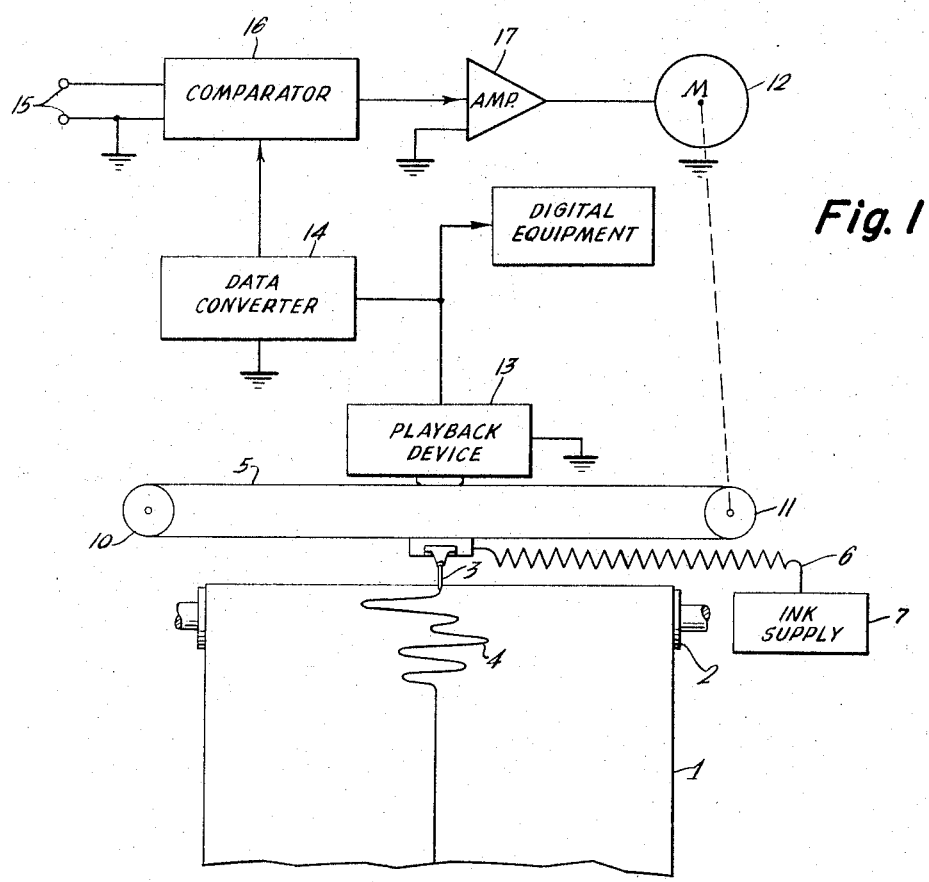
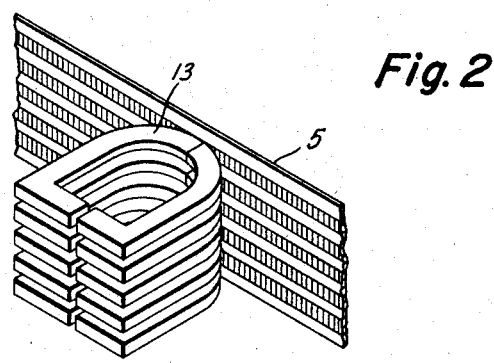
INVENTOR.
FRANCIS A. LAPINSKI
BY
ATTORNEY

United States Patent Office 3,315,266
Patented Apr. 18, 1967

3,315,266
RECORD DRIVE SYSTEM INCLUDING
FEEDBACK MEANS
Francis A. Lapinski, Ambler, Pa., assignor to Honeywell
Inc., a corporation of Delaware
Filed Nov. 25, 1964, Ser. No. 413,727
9 Claims. (Cl. 346—32)

This invention relates to recorders. More specifically, the present invention relates to a recorder drive system including feedback means.

An object of the present invention is to provide an improved drive for a recording element of a recorder.

Another object of the present invention is to provide an improved recorder having a low inertia recording element drive with feedback reference signal generating means.

Anothesr further object of the present invention is to provide an improved recorder for linearly recording non-linear input signals.

A further object of the present invention is to provide an improved recorder having an inherent analog to digital conversion of an input signal to be recorded.

A still further object of the present invention is to provide a recorder having a combined recording element drive and element position signal generating means.

Still another object of the present invention is to provide an improved recording element drive and element position signal generating means.

A further object of the present invention is to provide an improved recorder, as set forth herein, having an improved operation and simple construction.

In accomplishing these and other objects, there has been provided, in accordance with the present invention, a recorder having a drive system for the recorder recording element including a motor driven endless tape loop supporting, on one leg thereof, a recording element in contact with a recording chart. The tape loop is provided with, on a leg thereof opposite to the position of the recording element, a magnetic recording surface having a prerecorded series of signals which are used to identify each incremental portion of the recording surface. A playback device is used to read the recorded information to provide an output signal representative of the position of the tape and the attached recording element. The output signal from the playback signal is converted into a reference signal for comparison with an input device to be recorded by a signal comparator apparatus. The output signal from the comparator representing the error between the reference signal and the input signal is used to energize a motor drive for the tape to produce an equality in the compared signals.

A better understanding of the present invention may be had when the following detailed description is read in connection with the accompanying drawings, wherein:

FIGURE 1 is a pictorial representation of a recorder embodying the present invention; and FIG. 2 is a perspective view, showing a multi-track playback device and recording medium.

Referring to the drawing in more detail, there is shown a recording element drive apparatus comprising a recording chart 1 which is suitably driven across a support roller 2. A recording pen 3 is arranged in contact with the surface of the chart 1 to produce a record trace 4. The pen 3 is supported on a movable inelastic strip, such as tape 5, and is supplied with ink along a capillary 6 from an ink supply 7.

The tape 5 is formed into an endless loop and is supported on a pair of rollers 10 and 11. The roller 11 is arranged to be driven by a reversible motor 12 to bi-directionally drive the pen 3 across the chart 1. The surface of the tape 5 on the opposite side of the loop from the pen 3 is arranged to have a recording surface thereon suitable for use by the drive system, as is explained more fully hereinafter. A suitable playback device 13 for the recorded signals is arranged adjacent to the record surface of the tape 5 to produce output signals in response to the information which is prerecorded on the aforesaid surface of the tape 5. The output signals from the playback device 13 are applied to a data converter 14 for conversion into suitable signals for use by a signal comparator 16. The signal comparator 16 is arranged to compare the output signal from the converter 14 with input signals applied to input terminals 15 and to produce an output signal indicative of the polarity and magnitude of the difference therebetween. This difference, or error, output signal from the comparator 16 is amplified by amplifier 17 and is applied to the motor 12 to drive the pen 3 across the chart 1 until the comparator 16 senses an equality between the input signal at terminals 15 and the output signal from the converter 14.

In operation, the recorder drive of the present invention is effective to position the pen 3 in response to variations of the input signal applied to input terminals 15. This input signal is compared by comparator 16 with a feedback reference signal derived from a pen position sensing device using a prerecorded magnetic signal on the tape 5 which tape is driven by motor 12. The tape 5 carries the recording pen 3 so that any motion of the tape 5 is shown as an inked representation 4 on the chart 1. Thes back loop of the tape 5 may be coated with a conventional magnetic recording surface which extends along the tape 5 for a distance substantially identical with the range of travel of the pen 3 on the chart 1. Thus, as the pen 3 moves from one edge of the chart 1 to the other edge thereof, a prerecorded signal is always beneath the playback device 13.

The playback device 13 is a suitable magnetic transducer having static field responsive capabilities as well as an ability to sense a magnetic signal on a recording tape; i.e., a magnetic flux responsive head. The signals on the prerecorded section of the tape 5 are arranged to provide a signal from the playback device 13 for each incremental section of the recorded tape surface. For example, the recording may be a binary code on a multi-track recording having a suitable maximum binary code magnitude to cover the range of tape travel to uniquely identify each tape increment. In this case, the playback device 13 would be a multi-channel transducer having a plurality of magnetic heads to respond to respective channels on the tape 5, as shown in FIG. 2. As the recorded surface on the tape 5 is scanned by the playback device 13, the binary code would be arranged to increase from one end of the recorded surface corresponding to one side of the chart 1 and a minimum input signal to a maximum value at the other end of the recorded surface corresponding to the other side of the chart 1 and a maximum input signal.

The sensed binary code signal from the playback device 13 is applied to a converter 14 for binary to analog conversion operation whereby an analog signal is derived having a magnitude corresponding to the binary code signal. It is to be noted that, since a binary, or digital, representation of the pen position and, hence, the magnitude of the input signal is available at the output of the playback device 13, this digital signal may be applied to appropriate devices such as a digital computer, an automatic typewriter, paper punch, etc. for a further processing thereof. Since the binary code on the recorded section of the tape 5 is recorded with a high recording density, a change in the binary code may represent, a one-hundredth of an inch or less of movement of the tape 5. Thus, the change in magnitude of the output signal from the converter 14 is representative of incremental movements of the tape 5. The analog output signal from the converter 14 is applied to the comparator 16 to be compared with the input signal at the input terminals 15. The comparator 16 is effective to compare the input signals thereto and to produce an output signal having a magnitude representative of the difference, or error, and a polarity indicative of the direction of the error; i.e., is the input signal larger or smaller than the feedback reference signal. This output signal is amplified by power amplifier 17 and is applied to motor 12 which motor is arranged to drive the tape 5 by means of roller 11.

The polarity of the error signal from the comparator 16 is effective to energize the reversible motor 12 to produce a motion of the tape 5 whereby to reduce the error signal. Thus, the motor 12 is energized to drive the tape 5 to either increase or decrease the analog output signal from the converter 14 to produce an equality between the feedback reference signal and the error signal on input terminals 15. The magnitude of the error signal is effective to produce a rapid motion of the tape 5 for a large error and to diminish the speed of the tape 5 as the error is reduced. When the difference between the reference signal and the input signal is reduced to a substantially zero magnitude, the motor 12 is stopped and the playback device 13 continues to sense the stationary binary code signal on the tape 5 to enable the comparator 16 to continuously make a comparison with the input signal. If the input signal again changes in magnitude, the comparator 16 would immediately produce an error signal to reenergize the motor 12 and drive the tape 5 and pen 3 to a new position which will produce a feedback reference signal to balance the input signal. The aforesaid movements of the tape 5 are, of course, reproduced on the chart 1 by the pen 3 to provide a record of the variations in the magnitude of the input signal applied to input terminals 15.

Inasmuch as the tape 5 has an inherently low inertia, the combination of the tape supported pen 3, tape 5, and rollers 10 and 11 forms a low inertia recording element drive. Thus, the recorder drive system of the present invention is effective to accurately follow rapid changes in the magnitude of the input signal. It is to be noted that the recorded signal on the tape 5 indicative of the incremental position of the tape 5 may be arranged in a non-linear fashion to adapt the recorder to an inherent linear recording of nonlinear input signals; e.g., thermocouple signals. Thus, the nonlinear recording would be arranged to follow the nonlinear curve of the input signal while producing linear movements of the pen 3 on the chart 1. If a suitable number of recording tracks and playback devices were used, the recorder could be used interchangeably between linear and nonlinear input signals by controlling the output signals from the playback device 13 to select either magnetic head signals from the linear record tracks or the nonlinear record tracks on the tape 5.

Accordingly, it may be seen that there has been provided, in accordance with the present invention, an improved recorder having a novel feedback reference signal aparatus for use in a drive control system to drive the recording element of the recorder with the recorder having inherent capabilities for linearization of nonlinear input signals and digital representation of the position of the recording element to operate associated digital devices.

What is claimed is:

1. A recorder for recording an input signal comprising, a recording element, an endless tape loop supporting said recording element, a prerecorded signal upon said tape loop characteristically arranged to uniquely represent each tape increment, a playback device arranged to sense said characterized signals on said tape and to produce a reference signal therefrom, signal comparing means operative to compare said reference signal and said input signal to produce an output signal, and tape loop drive means arranged to drive said tape loop in response to said output signal, whereby a substantial equality is achieved between said reference signal and said input signal.

2. A recorder drive system for recording an input signal upon a recording medium comprising, a recording element, a substantially inelastic strip member supporting said element in contact with said recording medium, motor means arranged to drive said strip member to produce a bidirectional movement of said recording element across said recording medium, a prerecorded successive information signal characteristically arranged on a portion of said strip member to uniquely represent each tape increment portion thereof, responsive means arranged to sense said prerecorded characterized signals to produce a succession of reference signals representative of the incremental positions of said strip member, and signal comparison means connected for comparing said input signal and said reference signal from said responsive means to produce an error signal for energizing said motor means and displacing said strip member until said reference signal from said responsive means is substantially equal to said input signal.

3. A recorder drive system as set forth in claim 2 wherein said strip member is formed into an endless loop configuration with said recording element being supported on one leg of said loop while said information signals are recorded on the other leg of said loop.

4. A recorder drive system as set forth in claim 2 wherein said strip member has a magnetic recording surface for said information signals and said responsive means includes a magnetic flux responsive reading head.

5. A recorder drive system as set forth in claim 2 wherein said characterized information signals are a succession of binary coded signals having an increasing magnitude from one end of said strip member to the other to characteristically identify each incremental position of said recording element upon said recording medium.

6. A recorder drive system as set forth in claim 5 wherein said responsive means includes, an output signal terminal, digital equipment means connected to said output signal terminal for indicating said binary coded signals, and converter means for supplying said binary coded signal to said comparison means in suitable form.

7. A recorder drive system as set forth in claim 2 additionally comprising, said strip member having a magnetic recording surface for said characterized information signals, said characterized information signals including a first group of recording tracks having a linearly recorded succession of information signals and a second group of recording tracks having a nonlinear recorded succession of information signals, and said responsive means includes a first group of reading heads and a second group of reading heads arranged to selectively read information signals in said first and second groups of recording tracks, respectively.

8. A recorder drive system as set forth in claim 2 comprising additionally, roller means for supporting said strip member and said recording element, the combination thus forming a recording element drive arranged for substantial reduction of inertia thereby providing for rapid system response and increased system accuracy.

9. A recorder for recording an input signal upon a recording medium comprising,
 a recording element,
 an endless tape loop supporting said recording element on one leg of said loop while the second leg thereof includes a magnetic recording surface,
 roller means operable to support said endless tape loop and said recording element in a low inertia combination contacting said recording medium,
 motor means arranged to bidirectionally drive said endless tape loop thereby displacing said recording element across said recording medium,
 prerecorded successive information signals characteristically arranged on said magnetic recording surface in the form of a characterized binary coded signal increasing in magnitude from one end of said strip member to the other for characteristically identifying each incremental position of said recording element upon said recording medium, magnetic flux responsive reading head means arranged for sensing said prerecorded characterized signals to produce a binary reference signal characterized in accordance with said prerecorded signal, digital equipment means fo receiving and utilizing said characterized binary reference signal, converter means operably receiving said characterized binary reference signal for producing a converted characterized reference signal, and signal comparison means connected for receiving said input signal to be recorded and said characterized reference signal from said converter means to produce an error signal for energizing said motor means and displacing said endless tape loop until said characterized reference signal is substantially equal to said input signal thereby providing for a characterized correction of nonlinear errors within said input signal.

References Cited by the Examiner
UNITED STATES PATENTS

| | | | |
|---|---|---|---|
| 2,684,473 | 7/1954 | Shannon | 346—32 |
| 2,907,938 | 10/1959 | Hodgers et al. | 318—20.105 |
| 2,947,929 | 8/1960 | Bower | 318—20.100 |
| 2,985,728 | 5/1961 | Macune | 346—32 |
| 3,066,867 | 12/1962 | Krause et al. | 318—20.310 |
| 3,175,161 | 3/1965 | Hackborn et al. | 346—139 |
| 3,202,895 | 8/1965 | Arp et al. | 318—20.320 |

RICHARD B. WILKINSON, *Primary Examiner.*

J. G. MURRAY, H. B. KATZ, J. W. HARTARY,
*Assistant Examiners.*